(12) United States Patent
Rehm et al.

(10) Patent No.: US 8,125,171 B2
(45) Date of Patent: Feb. 28, 2012

(54) PROCESS FOR DRIVING AN ELECTRIC MACHINE AND DRIVER SYSTEM THEREFOR

(75) Inventors: Lothar Rehm, Herrenberg (DE); Thomas Von Raumer, Stuttgart (DE)

(73) Assignee: Daimler AG, Stuttgart (DE)

( * ) Notice: Subject to any disclaimer, the term of this patent is extended or adjusted under 35 U.S.C. 154(b) by 844 days.

(21) Appl. No.: 11/579,532

(22) PCT Filed: Apr. 27, 2005

(86) PCT No.: PCT/EP2005/004485
§ 371 (c)(1),
(2), (4) Date: Oct. 9, 2008

(87) PCT Pub. No.: WO2005/109591
PCT Pub. Date: Nov. 17, 2005

(65) Prior Publication Data
US 2009/0051309 A1 Feb. 26, 2009

(30) Foreign Application Priority Data
May 5, 2004 (DE) .......................... 10 2004 022 767

(51) Int. Cl.
*H02P 1/04* (2006.01)

(52) U.S. Cl. ... 318/430; 318/434; 318/440; 318/400.09; 361/23; 361/30

(58) Field of Classification Search ............... 318/16, 318/434, 430, 440, 561, 727, 400.09; 361/30–34, 361/23; 340/12.22, 425.5, 870.11; 701/49
See application file for complete search history.

(56) References Cited

U.S. PATENT DOCUMENTS
3,691,396 A * 9/1972 Hinrichs .................... 307/40
(Continued)

*Primary Examiner* — Paul Ip
(74) *Attorney, Agent, or Firm* — Crowell & Moring LLP

(57) ABSTRACT

A method for operating an electric machine with a driver system is provided, in which an operating variable of the electric machine and/or of the driver system is monitored. The validity of the input variables is checked with regard to their checksum and whether the input variables are up-to-date, and the permissibility of an actual moment (Mist2) of the electric machine depending on the operating state of the electric machine is checked. In case of invalid input variables or invalidity of the actual moment (Mist2), a fault reaction is initiated. In addition, the implementability of the planned change of rotary speed is checked and, in case of non-implementability, changed over into a more favorable mode of operation of the electric machine. An electric machine used as a starter/generator in a motor vehicle can be monitored.

15 Claims, 2 Drawing Sheets

U.S. PATENT DOCUMENTS

Figure 1:
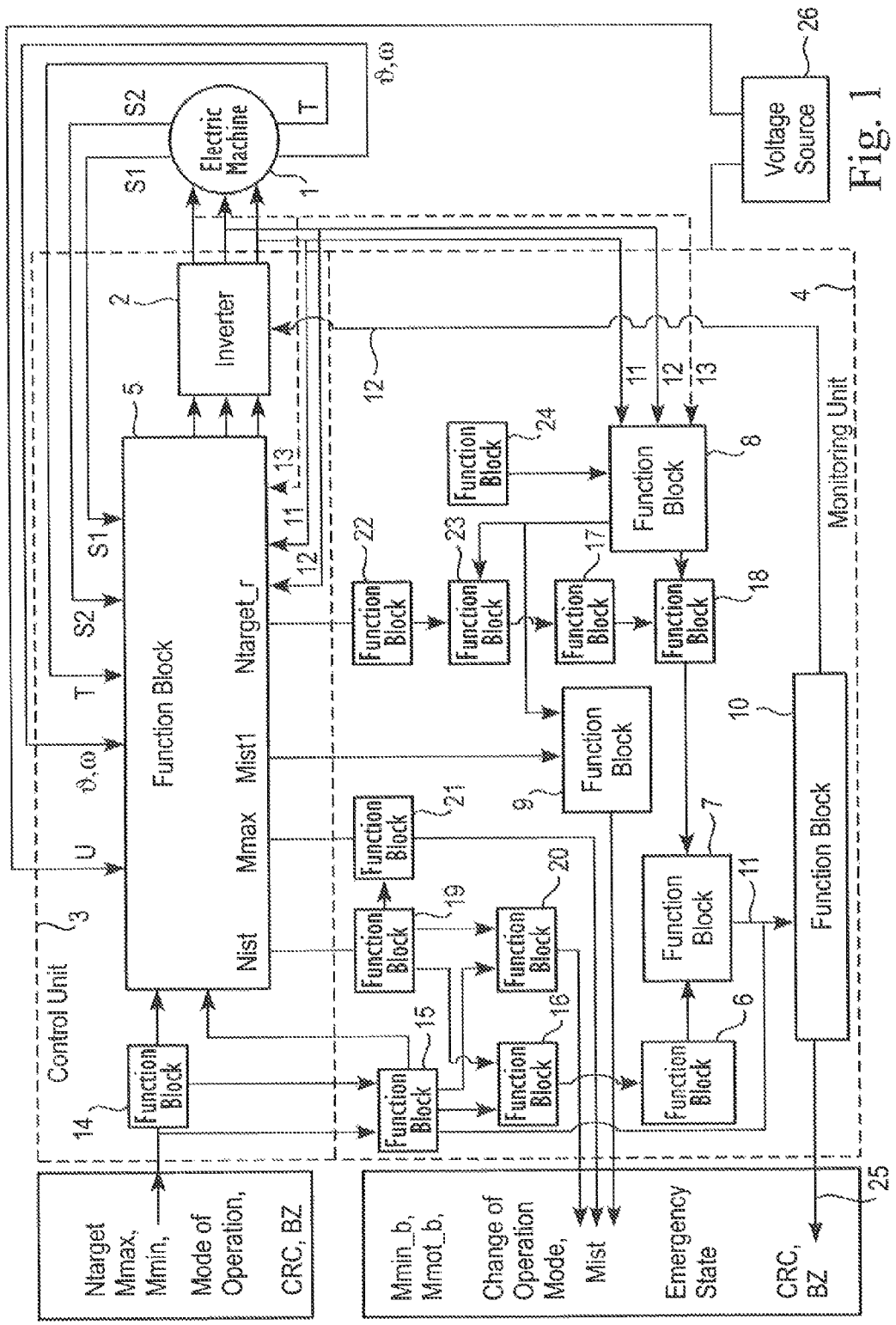

| | | | | |
|---|---|---|---|---|
| 4,205,325 A * | 5/1980 | Haygood et al. | 340/870.11 |
| 4,206,491 A * | 6/1980 | Ligman et al. | 361/172 |
| 5,828,316 A * | 10/1998 | DiCroce | 340/12.22 |
| 6,175,795 B1 * | 1/2001 | Sumida | 701/49 |
| 7,123,002 B2 * | 10/2006 | Lohberg et al. | 324/207.11 |
| 7,437,201 B2 * | 10/2008 | Cullen | 700/29 |
| 7,693,626 B2 * | 4/2010 | Breed et al. | 701/29 |
| 7,760,080 B2 * | 7/2010 | Breed et al. | 340/447 |
| 2003/0183024 A1 * | 10/2003 | Lohberg et al. | 73/865.9 |
| 2004/0056611 A1 * | 3/2004 | Mayhew et al. | 318/16 |
| 2004/0056615 A1 * | 3/2004 | Jonsson et al. | 318/434 |
| 2004/0056619 A1 * | 3/2004 | Jonsson et al. | 318/440 |
| 2004/0056631 A1 * | 3/2004 | Derksen | 318/727 |
| 2004/0130442 A1 * | 7/2004 | Breed et al. | 340/443 |
| 2004/0135534 A1 * | 7/2004 | Cullen | 318/609 |
| 2004/0207344 A1 * | 10/2004 | Derksen | 318/16 |
| 2005/0125117 A1 * | 6/2005 | Breed | 701/29 |
| 2005/0162159 A1 * | 7/2005 | Lohberg et al. | 324/244 |
| 2006/0049793 A1 * | 3/2006 | Mayhew | 318/800 |
| 2008/0201054 A1 * | 8/2008 | Grichnik et al. | 701/102 |
| 2008/0212127 A1 * | 9/2008 | Takeyama | 358/1.15 |
| 2008/0284575 A1 * | 11/2008 | Breed | 340/438 |
| 2009/0021205 A1 * | 1/2009 | Cullen | 318/561 |
| 2009/0033474 A1 * | 2/2009 | Chen | 340/425.5 |
| 2009/0043441 A1 * | 2/2009 | Breed | 701/29 |
| 2009/0315494 A1 * | 12/2009 | Jeung et al. | 318/400.09 |
| 2010/0207754 A1 * | 8/2010 | Shostak et al. | 340/450 |
| 2010/0298088 A1 * | 11/2010 | Rouis et al. | 477/3 |

* cited by examiner

PROCESS FOR DRIVING AN ELECTRIC MACHINE AND DRIVER SYSTEM THEREFOR

CROSS REFERENCE TO RELATED APPLICATIONS

This application is a national stage of PCT International Application No. PCT/EP2005/004485, filed Apr. 27, 2005, which claims priority under 35 U.S.C. §119 to German Patent Application No. 10 2004 022 767.5 filed May 5, 2004, the entire disclosures of which are herein expressly incorporated by reference.

BACKGROUND AND SUMMARY OF THE INVENTION

The present invention relates to a process for operating an electric machine and a driver system for an electric machine.

German patent document DE 198 35 576 A1 discloses a driver system for a permanently energized electric motor in which the driver system includes a driver arrangement for driving power electronics and an operating state detection arrangement for detecting an operating state of the driver system and/or the electric motor. If the operating state detection arrangement detects the presence of at least one pre-defined operating state, then the driver arrangement generates a command for producing a short circuit between all the connections of the electric motor. The predefined operating state is a fault state which includes at least the following faults: dropping off or failure of a motor supply voltage, faults in the area of a motor position sensor, faults in the area of a current sensor for detecting the current flowing in at least one phase, short circuit faults (in particular in the area of the motor), or increase of an intermediate circuit voltage over a predefined limit value.

The number of electronic components in motor vehicles is constantly increasing. Consequently, the complexity of the networks used in motor vehicles, or of the cross-linking of components, is increasing. For example, drive-by-wire systems have increased the number of electronic components in motor vehicles. This increase in electric components and cross-linking requires a careful monitoring of the functionality of the components and of the networks associated with them.

It is thus an objective of the present invention to provide a method for operating an electric machine with a driver system which monitors the functionality of the relevant components, and in given cases, engages suitable measures to avoid undesirable consequences. In particular, it is an objective of the present invention to ensure the reliability of the parameters relevant to safety. It is another objective of the present invention to provide a device for carrying out the method.

The present invention includes a method for operating an electric machine with a driver system, in which an operating variable of the electric machine or the driver system is monitored. The validity of the input variables of the driver system may be checked in parallel in two independent function blocks. A fault reaction may be produced, if at least one of the two function blocks determines that the input variables are invalid.

By checking the validity of the input variables, incorrect input variables may be detected. Input variables are customarily transmitted from a network to the control unit. The network can, for example, be based on a CAN bus, on MOST, on a light conductor bus, or on a FlexRay communications system. Transmission errors can occur, e.g., due to a transmission path which is faulty and/or subject to interference. The transmitted input variable, also called a message, can be incorrect or out-of-date. In the control unit itself, the input variable can be stored incorrectly, due to faulty memory modules, in particular ROM faults or RAM faults. Furthermore, operating errors can occur. For example, network commands may be executed incorrectly or an incorrect network command may be executed. The input variables are then designated as valid, if they are current and without transmission errors. In particular, information concerning whether the input variables are up-to-date and a checksum may be checked. The two validity checks may be processed in the same time window. Therefore, there are two independent, simultaneous checks. A fault is considered as recognized if one of the two checks recognizes a fault. Accordingly, the reliability of the input variable being up-to-date and freedom from error of the input variables thus checked can be increased.

In another exemplary embodiment of the present invention, a moment mode, a charging mode, and a rotary speed mode are provided. In particular, the electric machine can be operated in these modes. Naturally, other modes can also be provided. This has the advantage that the electric machine can be adapted precisely to the behavior desired by a user. In the charging mode, the electric machine is regulated so that an effective charging of a battery can be achieved. In the moment mode, the moment is intended to be regulated. In the rotary speed mode, on the contrary, the rotary speed is the variable which should be held constant or varied according to the wishes of the user.

In another exemplary embodiment of the invention, a maximum and a minimum permissible moment are generated, depending on the operating mode of the electric machine. In each operating mode, the loadability of the electric machine is different. If the limits of the permissible moments are determined depending on the mode of operation, the result corresponds better to the values which can be realized without damaging consequences. The mode-dependent limit values are more precisely adapted to the state of the electric machine and the needs of the user, where incorrect loads are avoided and the permissible operational range is utilized in an optimal manner.

According to another exemplary embodiment of the invention the permissibility of an actual moment of the electric machine is checked in a stepwise comparison with respect to several comparison variables. Thus, a precise checking of the actual moment for permissibility is possible with high error recognition. All the conceivable limits and impacts can be taken into account. The results of the different checks may be combined to form one result. Also, the results of the different comparisons can, in given cases, be compared and correlated to one another still further.

According to another exemplary embodiment of the invention, the permissibility of an actual moment of the electric machine is checked in a parallel comparison to several comparison variables. Here, all the results may be supplied independently of one another to one or more function blocks operating as a fault reaction unit.

The device for carrying out the method starts from a driver system for an electric machine, in which the driver system includes a control unit and a monitoring unit. According to the present invention, the monitoring unit includes an adapter for adapting input variables of the control unit to the operational parameters of the electric machine and/or a checker for checking the permissibility of the state variable of the electric machine.

By the permissibility of a state variable of the electric machine being checked, faults or faulty processes, also called process plane faults or function plane faults, can be determined within the control unit. Likewise, a faulty inverter or an inverter operating in a faulty manner and/or a faulty or not completely functional electric machine can be detected.

A fault may be defined as non-satisfaction of a requirement for a certain unit or of a certain unit. Double faults may be defined as two faults which occur within a short time window or time period and have no causal connection to one another. Duplicate faults may be defined as two faults which occur outside of the short time window and also have no causal connection to one another. Advantageously, these types of faults can, to the extent that they lead to deviations in the theoretical states, be discovered by the method according to the invention. Obviously, the foregoing enumeration of the types of faults is not exhaustive and, with the method according to the invention or the device according to the invention, other types of faults, e.g., causally connected faults, can be recognized.

The method according to the present invention can be integrated in a simple and straightforward manner in control units or control devices customarily provided in motor vehicles. Thanks to the high reliability of the method, corresponding electronic components or signals/variables can be monitored and evaluated rapidly. Consequently, a fault reaction can also be initiated immediately in order to avoid damage to electronic components and endangering the safety of the user. The method according to the invention may be implemented by software technology.

The monitoring of the corresponding components or signals and, in given cases, the initiation of the fault reaction or suitable measures is done autonomously, i.e., independently of a user reaction or, when used in a motor vehicle, independently of a reaction of the driver.

The method according to the invention or device according to the invention can advantageously be used in complex networks with a plurality of electronic components.

These and other objects, advantages and novel features of the present invention will become apparent from the following detailed description of the invention when considered in conjunction with the accompanying drawings.

BRIEF DESCRIPTION OF THE DRAWING FIGURES

Figure 2:
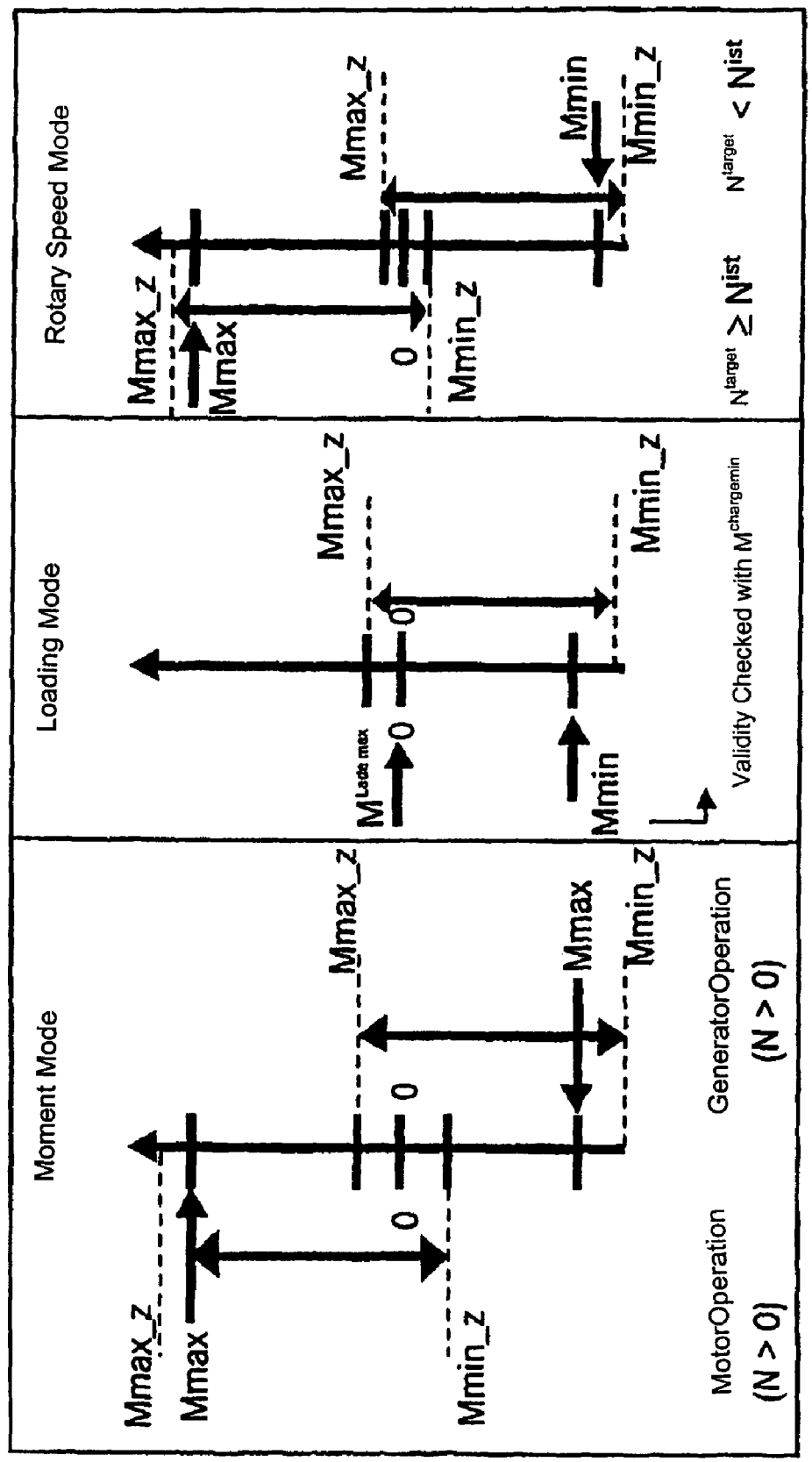

FIG. 1 illustrates a schematic representation of a functional block diagram of an embodiment of a method according to the present invention; and FIG. 2 illustrates a moment comparison in three modes of operation, according to the present invention.

DETAILED DESCRIPTION OF THE DRAWINGS

FIG. 1 shows a driver system for an electric machine 1 including a control unit 3 and a monitoring unit 4. The electric machine 1 may be a three-phase machine.

The control unit 3 comprises an inverter or an inverter unit 2, also designated as a power unit, and functions for driving or operating the electric machine 1. It can thus also be designated as the functional plane. These functions or functionalities serve, among other things, for converting or processing the moments required by the electric machine 1, monitoring components relevant to operating the electric machine 1, the diagnosis of input and output variables, and controlling system reactions in case of a fault. Here, a system is understood to mean the driving system, the electric machine, or the combination of both components. In the component monitoring, among other things, sensor components, positioning element components, such as the inverter 2, and signal paths assigned to the driving system are monitored. The sensor components can include current sensors, voltage inputs or sensors, rotary speed sensors, position sensors, and/or temperature sensors. When the method according to the invention or the device according to the invention is used in a motor vehicle, the monitoring may be done continuously per driving cycle.

The control unit 3 includes a function block 14. In the function block 14, the input variables Mmax, Mmin, and Ntarget, are checked for validity with the aid of a CRC checksum or a parity checksum and the message counter value. Mmax and Mmin are the torque limits for the electric machine 1 and thus contain the information for the theoretical moment Mtarget. In so doing, whether the variables are up-to-date is checked with the aid of the message counter value of a message counter. The completeness and correctness of the variables is checked with the aid of a checksum (for example, in the form of a CRC checksum or a parity checksum). If the checking for validity of the input variables leads to a valid result, then the variables are passed on to a function block 5. If the checking for validity of the input variables leads to an invalid result, then a fault message is generated and transmitted to function block 5 and a function block 15 disposed in a monitoring unit 4. Subsequently, corresponding emergency operation reactions are executed by the function block 5.

The control unit 3 comprises a function block 5 which has as input variables, checked by the function unit 14, the input variables Mmax, Mmin, and Ntarget for the electric machine 1, as well as a possible fault signal of a function block 15 of the monitoring unit 4. From these input variables, driver signals for the inverter 2 are generated in the function block 5. These driver signals are supplied to the inverter 2. The inverter 2 may include one half-bridge arrangement per phase (not shown) of the electric machine 1. A half-bridge arrangement customarily includes two transistors connected in series with freewheeling diodes associated with them. The inverter unit 2 may also include a capacitor (not shown) which is connected in parallel to the half-bridge arrangements. Instead of the transistors, other circuit elements can also be used, such as thyristors, IGBTs, MOSFETs, or relays. Via the inverter 2, the amplitude, frequency, and phase of the phase currents of the electric machine 1 are adjusted. Supplying of the electric machine 1 with the phase currents is done via the inverter 2. A supply voltage UDC, a temperature T of the electric machine 1, the operating mode of the electric machine 1 (moment mode, charging mode, rotary speed mode, or other modes (for example, emergency, standby)), a rotary speed Nist and/or a pole position θ and/or an electrical angular speed ω, the stator phase currents I1, I2, and/or, in given cases, I3, and/or the rotor phase currents S1 and S2 (for a rotor not permanently energized) may be supplied to the function block 5. Also, detection units for the pole position and a rotating electrical field may be present. The fact that the stator phase current I3 is optional is intended to be expressed by the dash-dotted representation of the signal flow of the stator phase current I3 in FIG. 1.

The monitoring unit 4 can also be designated as function monitoring plane and preferably serves for monitoring the control unit 3 or the execution of the functions in the control unit 3.

Another monitoring plane (not shown) which can be associated with the driver system, can test the proper functioning of the driver system, the control unit 3 or the monitoring unit 4 with a question/answer principle. If a fault should occur, then the triggering of corresponding system reactions or fault measures may be done independently of the driver system including the control unit 3 and the monitoring unit 4.

To supply power to the driver system and the electric machine 1, a current or voltage source 26 is provided. The voltage source 26 may have a nominal voltage of 200 V to 400 V, or of 14 V, 28 V, or 42 V and may include an energy storage device, e.g., a battery and/or a supercapacitor. Also, there may be a separate 12 V battery for the control unit 3. Obviously, the driver system and electric machine 1 can also be supplied with electrical energy by a generator and/or via a supply connection. In so doing, the energy can come from the vehicle or via a charging device from a socket outlet of a house service.

From a network (not shown), a CAN bus system, other bus system or from a line, a theoretical rotary speed Ntarget, information concerning the mode of operation, a CRC checksum or the like, a message counter value, a minimum moment Mmin, and a maximum moment Mmax are supplied to the driver system. Mmin and Mmax determine, in the modes of operation not regulated by moment, a range in which the moment of the electric machine 1 should lie, while in the mode of operation regulated by moment, the theoretical moment Mtarget is Mmax. The maximum moment Mmax and the minimum moment Mmin may be functions of time.

The input variables may be transferred before entry into the function block 14 of the control unit 3 to a function block 15, which is disposed in the monitoring unit 4.

The maximum moment Mmax and the minimum moment Mmin, also designated as limit moments, are also supplied to the function block 15. The supply or the pick-up of the limit moments Mmax and Mmin can either be done from the control unit 3 or the limit moments can already be picked up or sampled outside of the driver system from a network or a line and supplied to the function block 15 without running through the control unit 3. The limit moments Mmax and Mmin are determined by a coordinator which is stored in a control device, for example, of a motor vehicle. The limit values Mmax, Mmin can be dependent on temperature, pressure, and/or additional system and/or environmental variables. In particular, they can be dependent on the characteristic values for the electric machine 1 which makes them available to the coordinator (for example, Mmin_b, Mmax_b, as computed values for Mmax and Mmin).

The input variables Mmax, Mmin, Ntarget, the CRC or parity checksum, the message counter value, the mode of operation of the electric machine 1 and, in given cases, a fault message of the function block 14 are supplied to the function block 15. In the function block 15, the input variables Mmax, Mmin, Ntarget are checked for validity with the aid of the CRC or parity checksum and the message counter value. In so doing, whether the variables are up-to-date is checked with the aid of the message counter value of a message counter, and the completeness and correctness of the variables is checked with the aid of a checksum, either the CRC or parity. The checking in the function block 15 is realized in the same frame as the checking in the function block 14. Only in this way is it ensured that the results of variables of the same up-to-dateness are combined. If the checking for validity of the input variables leads to an invalid result, then a fault message is generated and transmitted to function block 5 of the control unit 3 and a function block 10 disposed in a monitoring unit 4 or a control unit provided for this and a corresponding fault reaction may be initiated by this function block/control unit. The electric machine 1 may be short-circuited via lines provided for this via the inverter 2, or the inverter 2 is disabled.

If this checking for validity of the input variables leads to a valid result, then the variables are passed on to a function block 20 and a function block 16.

In the function block 16, the variables Mmax2 and Mmin2 are generated from the input variables Mmax, Mmin checked and confirmed by the function blocks 14 and 15. The variables Mmax2 and Mmin2 are then stored as new upper and lower limits for Mist. In so doing, the limit of the input variable is done with characteristic curves of the maximum moments as a function of the rotary speed Nist2. Nist2 is supplied to the function block 16 from the function block 19.

In the function block 6, the permissible maximum moment Mmax_z dependent on the mode of operation and the permissible minimum moment Mmin_z dependent on the mode of operation are predefined from the mode of operation and the moment limits Mmax2 and Mmin2 and corresponding tolerances. Mmax_z is determined from Mmax2 taking into account the tolerances resulting from the rotary speed Nist2 and the moment. In the same manner, Mmin_z is determined from Mmin2 taking into account the tolerances resulting from the rotary speed Nist2 and the moment. In so doing, the values of Min_z and Max_z are dependent on the mode of operation of the electric machine 1.

FIG. 2 shows the different determination of the maximum and minimum permissible moment depending on the mode of operation. In principle, the moment limits of Mmin and Mmax are predefined. From them, Mmax_z and Mmin_z are generated with the tolerances as a function of the rotary speed and the value of the moment. In the moment mode, the theoretical moment is generated from Mmax. In the loading mode, Mmin limits the permissible loading moment. In addition, the maximum possible loading moment, in so far as it is greater than zero, is limited by a time function to the internal variable Mloadmax. In the rotary speed mode, Mmax_z and Mmin_z are computed with corresponding tolerances from Mmin and Mmax. The output variables of the function block 6, Mmax_z and Mmin_z, are supplied to an additional function block 7.

In the function block 7 a comparison to an actual moment Mist2 of the electric machine 1 takes place. This actual moment Mist2 may be determined from the stator currents I1, I2, and, in given cases, I3 of the electric machine 1. The stator currents may be determined by measurement and/or by an observer. The processes in the stator windings can be reproduced by fictitious two-phase equivalent windings d, q encircling the rotor. In so doing, the winding axis of the equivalent winding d decreases with the longitudinal axis of the rotor (not shown), while the second equivalent winding q lies in the transverse axis of the rotor. The transformation of the variables may be done in a function block 8.

A pole position $\theta$ and/or an electrical angular speed $\omega$ may be supplied to the function block 8 as additional input variables, along with the stator phase currents I1, I2, and, in given cases, I3. In addition, a function block 24 may be provided in which constants relevant for a current inverse transformation are stored, which as a rule are based on parameters of the electric machine 1. By means of the d-component and the q-component of the stator currents and with the constants from function block 24, the current actual moment Mist2 of the electric machine 1 can then be computed in the function block 8 ("Einführung in die Theorie geregelter Drehstromantriebe" ["Introduction to the Theory of Regulated Three-phase Drives"], Volume 1 Grundlagen [Foundations], Hansruedi Bühler, Birkhäuser Verlag Basel and Stuttgart, 1977, ISBN 3-7643-0837-0, "Grundzüge der elektrischen Maschinen" ["Fundamentals of Electric Machines", H. Eckhardt, Teubner Studienbücher, Stuttgart, 1982, ISBN 3-519-06113-9).

In the function block 7, there is a comparison of the actual moment Mist2 with the limits of the permissible moment Mmax_z and Mmin_z. If the actual moment Mist2 is greater than Mmax_z or smaller than Mmin_z, then after a corresponding debouncing, which may be via a line 11, a fault signal is transmitted to a function block 10. The line 11 can obviously also be realized by software technology. The function block 10 serves to initiate a fault reaction or to engage corresponding measures in case of a fault. If a fault signal is transmitted to the function block 10, e.g., via a line 11, then said function block may transmit a corresponding signal via a line 12 to the inverter 2, which drives the inverter 2, or its circuit elements (not shown), in such a manner that the electric machine 1 is short-circuited or which triggers a short circuit of the electric machine 1 via the inverter 2. Depending on the form of embodiment of the connected electric machine 1, the inverter 2 can also be disabled.

In the method according to the present invention, a redundant actual moment Mist1, is as a rule, determined in the plane 1 (control unit 3). The determination of the actual moment Mist1 serves to signal the current moment back to other control devices for checking and additional monitoring of the actual moment Mist2 generated in the function block 8, and thus the monitoring of the functionality of the control unit 3 and/or of the electric machine 1. The actual moment Mist1 can, for example, be determined in the function block 5, analogously to the actual moment Mist2.

The actual moment Mist1 may be supplied by the function block 5 of the control unit 3 to a function block 9 of the monitoring unit 4.

In the function block 9, the actual moment Mist1 and the actual moment Mist2 generated in the function block 8 from a current inverse transformation are compared. For this comparison a tolerance band is provided. If the result of the comparison lies within the tolerance band, then a value Mist is output as a confirmed value to the output of the monitoring unit 4 for a CAN or the like. If the actual moment Mist1 deviates by more than a certain amount from the actual moment Mist2, then after a corresponding debouncing an invalid value Mist_inval is output to the output of the monitoring unit 4 and a fault signal is generated, which transmitted to the function block 17 or the function block 10.

From the function block 10, a signal may then be transmitted on a line 12 to the inverter 2, the signal leading to the circuit elements (not shown) of the inverter 2 being driven in such a manner that a short-circuit of the electric machine 1 is generated, or, depending on the form of embodiment of the connected electric machine 1, the inverter 2 is disabled.

The predefined amounts by which the actual moment Mist2 may deviate or not deviate from the theoretical moment Mtarget_r2 or Mist1 may be stored in a control device or in another storage area. In the case of the motor vehicle application, the control device or the driver system may be a motor control device or a vehicle control device.

In the method according to the present invention, a theoretical moment Mtarget_r reduced to the limits of the physically possible (loadability of the electric machine 1 taking into account the current temperature, battery limits, etc.) may be supplied by the function block 5 or the control unit 3 to a function block 22 of the monitoring unit 4.

The torque Mtarget_r is filtered in the function block 22. This is a temporal filter which corresponds, approximately, to the time which the actual moment Mist needs in order to adapt via the current to the desired theoretical value Mtarget. Failure of the subsequent comparison due to the delayed adaptation of Mist is intended to be prevented. The time-delayed torque Mtarget_r is transmitted further from the function block 22 to a function block 23.

In the function block 23, the reduced and time-delayed torque Mtarget_r is compared to the actual moment Mist2 generated via the current inverse transformation in function block 8. In so doing, it is checked whether Mtarget_r and Mist2 lie within the one common tolerance band. If this is the case, then Mist2 is transmitted further as an output value to the function block 17. If one of the two values Mtarget_r and Mist2 lies outside the tolerance band, then after corresponding debouncing an invalid equivalent value Mist_inval is set.

In function block 17, it is checked whether at least one of the comparisons of function block 9 or function block 23 has output an invalid value. If this is the case, then function block 17 passes a value Mist_inval on to the function block 7.

In an alternative embodiment, the function blocks 9 and 23 generate no signal in the case of a successful comparison, and set an output signal only in case of a fault. In this embodiment, the function block 17 checks whether it has received a signal at one of its inputs. If this is the case, then it passes on a signal to a function block 18. In this case, the function block 18 generates a value Mist_inval and directs it further to the function block 7. If the function block 18 receives no signal from function block 17, then it directs the actual moment Mist2 generated by the function block 8 on to the function block 7.

The monitoring unit 4 illustrated FIG. 1 includes a function block 19, which has as input variable a rotary speed Nist of the electric machine 1. The function block 19 receives the variable Nist from the function block 5 which receives the variable directly from the electric machine 1. In function block 19, the value for Nist transmitted from the electric machine 1 is confirmed. For this purpose, a value Nist1 is determined in the function block 19 from the temporal change of the pole position θ or the angular speed ω of the electric machine 1. The variables θ (t) or ω may be stored in their own memory area of the function block 5 and are also transmitted from the function block 5 to the function block 19. Confirming the angular information can, for example, be done via the check whether $\sin^2 + \cos^2 = 1$. The value Nist transmitted from the function block 5 to the function block 19 is considered as confirmed, if the value Nist1 lies within a fixed tolerance band about the value Nist. The new confirmed value is denoted by Nist2. The function block 19 passes the value Nist2 on to a function block 20 and a function block 21.

In the function block 20, the variable Nist 2 is compared to an input variable Ntarget which has been confirmed, checked for validity, and transmitted further from the function block 15. This comparison allows an applicable maximum deviation between Nist2 and Ntarget as a function of the gradient of Ntarget. Applicable in the present text means usable within the physical limits without damage to the electric machine 1. If Nist2 deviates from Ntarget more than permitted, then the function block 20 outputs a command for a change of the mode of operation of the electric machine 1. The change may be into the moment mode. The command for a change of mode of operation is output at an output of the monitoring unit 4.

The function block 21 receives as input variables the variable Nist2 from the function block 19 and a variable Mmax as confirmed and validity checked variable from the function block 5. The variable Nist 2 is used in function block 21 in order to carry out a limiting of Mmax to a physically possible maximum moment. For this purpose the physically possible maximum moments are stored in the function block 21 as a function of the rotary speed Nist2 as a characteristic curve. The result of the limiting of the maximum torque Mmax above by the characteristic curve is a new physically permitted value Mmax2 which is equal to or less than Mmax. The value Mmax2 is output to an output of the monitoring unit 4.

The control unit 3 and monitoring unit 4 may be disposed in different storage areas of a storage device. Thus, a physically separated monitoring of the control unit 3 by the monitoring unit 4 is advantageously possible. Faulty storage areas of the control unit 3 then have no impact on the functions or functionalities running in the monitoring unit 4, such as, for example, the plausibility checking of the theoretical moment Mtarget and the permissibility checking of the actual moment Mist1.

In an initialization or in an initial start of the driver system or the electric machine 1 there may be a monitoring/checking of the switch-off paths, given, for example, by the line 12, via which the electric machine can be switched off or short-circuited. For this purpose, a corresponding return line is to be provided which checks whether the switch-off path was activated.

In case of a fault, the user, or in the case of motor vehicle applications, the driver, may be informed. The information can be optical, acoustical, via a CAN bus, through a change of the system behavior, or, in the case of a motor vehicle, through a change of the behavior of the motor vehicle, and/or in another way.

The method according to the present invention, or the device according to the present invention, may be used for operating an electric machine, which is used in a motor vehicle. The electric machine can be operated as a starter/generator or as a motor/generator or as a light machine and can also be used in hybrid applications or as the drive mechanism in an electric vehicle or a fuel cell vehicle. The electric machine may be provided to support the traction drive of an internal combustion engine provided in the motor vehicle and/or to supply energy of an electrical system provided in the motor vehicle or alternatively as the sole traction drive with an alternative energy source (battery, fuel cell, etc.). The method according to the present invention or the device according to the present invention can be used in motor vehicles with diesel motors, as well as in motor vehicles with Otto motors.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating an electric machine in a motor vehicle with a driver system that includes a control unit, in which an operating variable of the electric machine or of the driver system is monitored, comprising:
   checking, by the control unit, the validity of input variables of the driver system in two independent input validity checking function blocks, in parallel; and
   producing a fault reaction by the control unit, if at least one of the two function blocks determines that at least one of the input variables is invalid,
   wherein an operating mode of the electric machine is provided as an input variable of the driver system, wherein at least one moment mode, one charging mode, and one rotary speed mode are provided as operating modes of the electric machine.

2. The method according to claim 1, wherein:
   the driver system comprises a monitoring unit; and
   one of the function blocks is associated, respectively, with each of the control unit and the monitoring unit.

3. The method according to claim 2, wherein a fault message is transmitted from the monitoring unit to the control unit, if the second function block determines that at least one of the input variables is invalid.

4. The method according to claim 1, wherein a maximum and a minimum permissible moment are generated as a function of the mode of operation of the electric machine.

5. The method according to claim 1, wherein the permissibility of an actual moment of the electric machine is checked in a multi-step comparison cascade using several different comparison variables.

6. The method according to claim 1, wherein the permissibility of an actual moment of the electric machine is checked in a plurality of comparisons which are independent of one another and are carried out in parallel to one another with respect to different comparison variables.

7. The method according to claim 1, wherein a theoretical moment, depending on the operational parameters of the electric machine, is reduced.

8. The method according to claim 7, wherein the reduced theoretical moment is compared to an actual moment and a fault reaction is initiated if the actual moment deviates from the reduced theoretical moment by more than a predefined tolerance range.

9. The method according to claim 1, wherein a first actual moment is generated in the control unit, a second actual moment is generated in the monitoring unit, the first actual moment is compared to the second actual moment, and a fault reaction is initiated if the second actual moment deviates from the first actual moment by more than a predefined tolerance range.

10. The method according to claim 9, wherein a confirmed actual moment value is output if the second actual moment does not deviate from the first actual moment beyond the predefined tolerance range.

11. The method according to claim 1, wherein, in case of a fault reaction, an emergency operation signal is output.

12. The method according to claim 1, wherein, in case of a fault reaction, the electric machine is short-circuited.

13. The method according to claim 1, wherein, in case of a fault reaction, a power stage is disabled.

14. The method according to claim 1, wherein an actual rotary speed of the electric machine is compared to a theoretical rotary speed, and a change of operating mode is requested if the actual rotary speed deviates from the theoretical rotary speed beyond a predefined tolerance range.

15. The method according to claim 14, wherein the tolerance range is a function of the gradient of the theoretical rotary speed.

* * * * *